No. 854,425. PATENTED MAY 21, 1907.
H. R. KING.
DYNAMO ELECTRIC MACHINE WITH COMMUTATING POLES.
APPLICATION FILED NOV. 2, 1906.
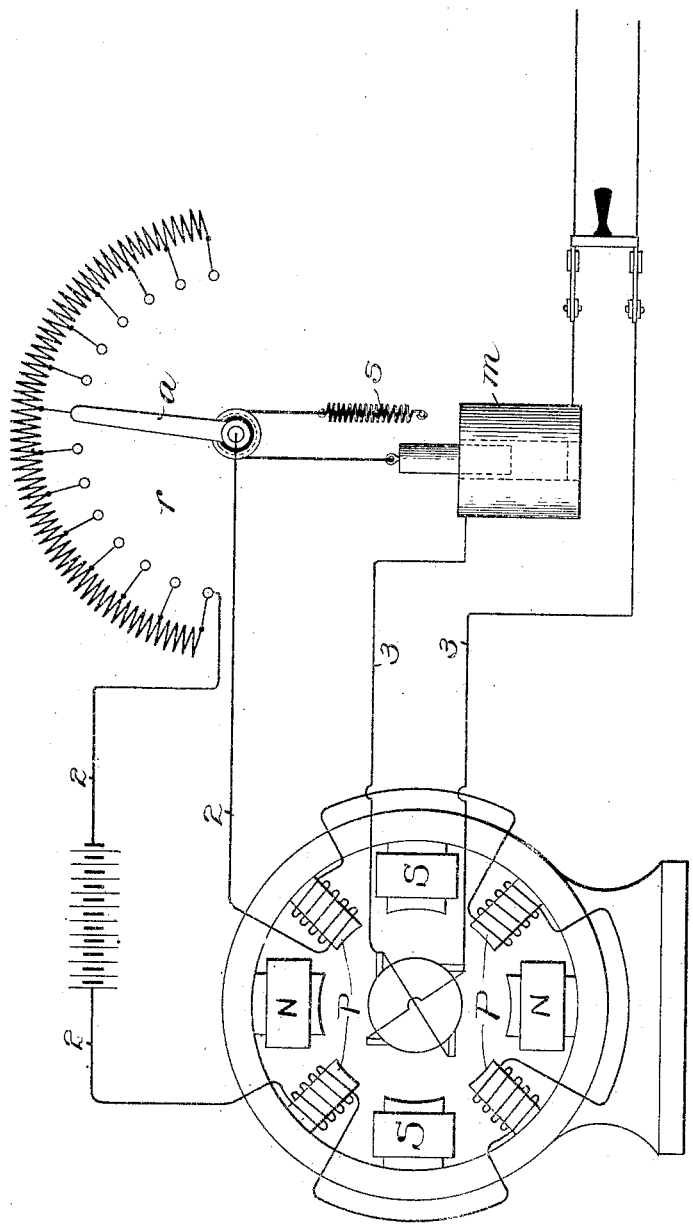
Witnesses:
W. H. Leach
Ged. C. Davison
Inventor:
Henry R. King,
By Barton, Tanner & Folk,
Attys.

UNITED STATES PATENT OFFICE.

HENRY R. KING, OF HINSDALE, ILLINOIS, ASSIGNOR TO WESTERN ELECTRIC COMPANY, OF CHICAGO, ILLINOIS, A CORPORATION OF ILLINOIS.

DYNAMO-ELECTRIC MACHINE WITH COMMUTATING-POLES.

No. 854,425.     Specification of Letters Patent.     Patented May 21, 1907.

Application filed November 2, 1906. Serial No. 341,672.

*To all whom it may concern:*

Be it known that I, HENRY R. KING, a citizen of the United States, residing at Hinsdale, in the county of Dupage and State of Illinois, have invented a certain new and useful Improvement in Dynamo-Electric Machines with Commutating-Poles, of which the following is a full, clear, concise, and exact description.

My invention relates to direct-current dynamos and motors which are provided with compensating field windings or so-called commutating poles, for the purpose of overcoming the tendency to sparking at the commutator; and my object is to provide an improved means for energizing the compensating windings so that large machines may be more easily designed and constructed for accurate compensation, at a minimum cost.

For the satisfactory operation of "interpole" or "commutating pole" dynamos or motors, it is necessary that the strength of the interpole field should vary directly as the current load on the armature, in order to produce sparkless commutation. Heretofore this variation has been produced by means of a winding for the commutating poles in series with the armature. In large machines or in machines which carry a heavy current, however, the series winding must be made up of heavy copper bars, as these windings have to carry all the current passing through the machines. As the commutating poles are located between the main field poles, the space for making and insulating the terminal connections is of course necessarily restricted on this account. The expense of handling and fitting such heavy copper bars is also a considerable item. In accordance with my invention these difficulties are obviated by providing a compensating winding for the commutating poles, of comparatively fine wire, and connecting this winding in a circuit distinct from the main armature circuit but carrying a current which varies with the main current.

I will describe my invention more particularly by reference to the accompanying drawing, which is a diagram illustrating one of several forms which the said invention may take.

The diagram shows a machine having four main field poles N N S S, and commutating poles P P located intermediate said main poles, immediately over the collecting brushes; that is, facing the armature coils which are undergoing commutation. The function of these commutating poles is to compensate for the effect of armature reaction upon the field and to furnish a flux adapted to build up a reversing electromotive force in the coils which, for the time being, are short circuited by the collecting brushes, so as to prevent sparking when the segments connected to such coils leave their respective brushes.

The windings of the poles P P are included in an energizing circuit 2 2 supplied with current from any suitable constant-potential source, the circuit being controlled by a rheostat $r$ operated by a solenoid $m$, the winding whereof is included in series with the main armature circuit 3 3. The source of current is indicated as a battery, but it will be understood that this symbol is diagrammatic only, and that any source of current of constant voltage may be used. In practice the energizing circuit may even be tapped off the main circuit. The rheostat shown consists of a series of resistance coils arranged to be cut in or out of the energizing circuit by a rotatable arm $a$ which is arranged to be operated by a pulley connected by a cord with the core of the solenoid $m$. A spring $s$ attached to the other end of the cord tends to maintain the arm $a$ in position to cut off all the resistance. As the current in the main circuit increases, the increasing pull of the solenoid overcomes the pull of the spring $s$ and causes the arm $a$ to swing around and cut out the resistance until a balance is obtained. The current in the energizing circuit 2 is thus caused to increase with an increase of the main current, and vice versa; so that the strength of the "commutating" field is always maintained at the proper value for sparkless commutation under all load conditions.

An especial advantage of my invention, in addition to those before described, is that the strength of the commutating poles may be adjusted to any desired value for a given load, by adjusting the automatic regulator which controls the energizing current without making it necessary to add to or subtract from the number of turns of wire upon the poles P P.

I claim:

1. The combination with a direct-current dynamo-electric machine having compensating field windings acting upon the armature coils undergoing commutation, of means for energizing said compensating windings, and an automatic controlling apparatus governing said energizing means, said apparatus being responsive to changes in the current through the armature circuit of said machine.

2. The combination with a direct-current dynamo-electric machine having compensating field windings acting upon the armature coils undergoing commutation, of a magnet in series with the armature circuit, and means for variably energizing said compensating field windings, controlled through the agency of said magnet.

3. The combination with a direct-current dynamo-electric machine having compensating field-windings acting upon the armature coils undergoing commutation, of an energizing circuit for said compensating windings, distinct from the armature circuit, and means controlled by the variation of current flow in the armature circuit for varying the current in said energizing circuit.

4. The combination with a direct-current dynamo-electric machine having commutating poles facing the armature coils undergoing commutation, of an energizing circuit for said commutating poles, distinct from the armature circuit, a rheostat controlling the flow of current in said energizing circuit, and a solenoid included in series in the armature circuit, the core of said solenoid being arranged to operate said rheostat.

In witness whereof, I, hereunto subscribe my name this 31st day of October A. D., 1906.

HENRY R. KING.

Witnesses:
JOHN G. ROBERTS,
ROY T. ALLOWAY.